US012664067B2

(12) United States Patent
Dhakate et al.

(10) Patent No.: US 12,664,067 B2
(45) Date of Patent: Jun. 23, 2026

(54) DATA PROCESSING PIPELINE WITH DATA REGRESSION FRAMEWORK

(71) Applicant: American Express Travel Related Services Company, Inc., New York, NY (US)

(72) Inventors: Hemant Narayan Dhakate, Phoenix, AZ (US); Swagata Ghosh, Phoenix, AZ (US); Rahul Agarwal, Noida (IN)

(73) Assignee: American Express Travel Related Services Company, Inc., New York, NY (US)

( * ) Notice: Subject to any disclaimer, the term of this patent is extended or adjusted under 35 U.S.C. 154(b) by 126 days.

(21) Appl. No.: 18/380,123

(22) Filed: Oct. 13, 2023

(65) Prior Publication Data

US 2025/0123941 A1 Apr. 17, 2025

(51) Int. Cl.
*G06F 11/00* (2006.01)
*G06F 11/32* (2006.01)
*G06F 11/34* (2006.01)

(52) U.S. Cl.
CPC ........ *G06F 11/3452* (2013.01); *G06F 11/327* (2013.01); *G06F 11/3404* (2013.01)

(58) Field of Classification Search
CPC . G06F 11/327; G06F 11/3404; G06F 11/3452
See application file for complete search history.

(56) References Cited

U.S. PATENT DOCUMENTS

| | | | | |
|---|---|---|---|---|
| 2015/0160974 A1* | 6/2015 | Kishore | .............. | G06F 9/4881 |
| | | | | 718/106 |
| 2021/0141623 A1* | 5/2021 | Bequet | .................... | G06F 9/546 |
| 2023/0091775 A1* | 3/2023 | Manzano | .............. | G06F 16/212 |
| | | | | 707/756 |
| 2024/0394311 A1* | 11/2024 | Dash | ................... | G06F 16/9024 |
| 2024/0427743 A1* | 12/2024 | Anusuri | ............... | G06F 16/258 |

* cited by examiner

*Primary Examiner* — Elmira Mehrmanesh

(57) ABSTRACT

An example embodiment provides a method that includes one or more of executing a sequence of job steps for a job by a sequence of job step executors within a data processing pipeline, recording current job execution data generated by the sequence of job step executors during the executing of the sequence of job steps, determining whether the executing of the sequence of job steps includes a deviation based on comparing the current job execution data to historical job execution data of the data processing pipeline stored in a data store, wherein the deviation is determined by comparing a current step execution dataset to a recorded step execution dataset in the data store, and generating a failure alert when the deviation is included.

17 Claims, 12 Drawing Sheets

200A

Legend

Create

Predecessor

Data Flow

Step 1 (Source)          241

Step 2 (Transform)          242

Step 3 (Source)          243

Step 4 (Transform)          244

Step 5 (Sink)          245

Parser
Module

121

Job Config File 111

Job Config 222
job code: Job 1

Step Config 232 step id:  Step 1
step type: source
predecessors : none
xref: sources config file

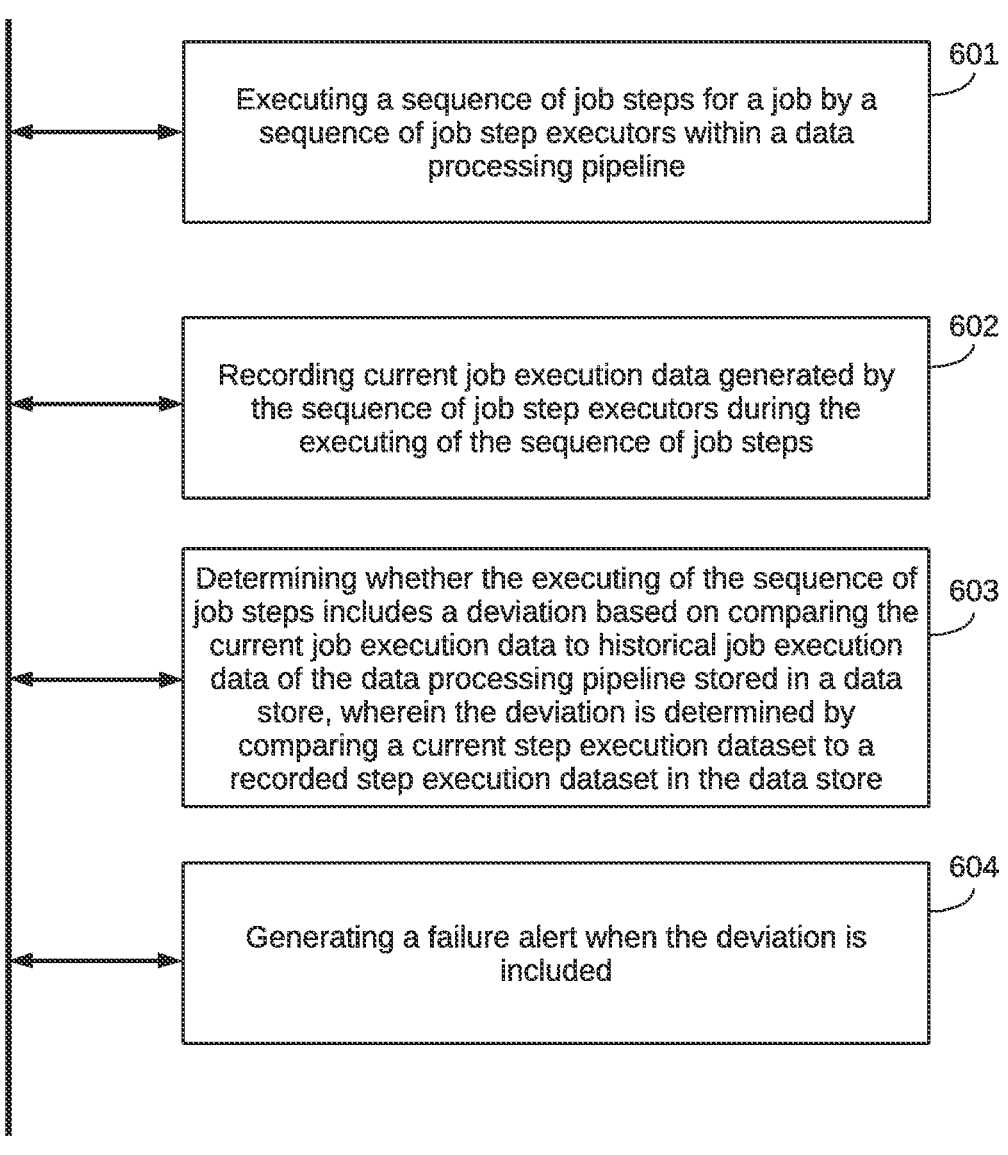

601

Executing a sequence of job steps for a job by a sequence of job step executors within a data processing pipeline

602

Recording current job execution data generated by the sequence of job step executors during the executing of the sequence of job steps

603

Determining whether the executing of the sequence of job steps includes a deviation based on comparing the current job execution data to historical job execution data of the data processing pipeline stored in a data store, wherein the deviation is determined by comparing a current step execution dataset to a recorded step execution dataset in the data store

604

Generating a failure alert when the deviation is included

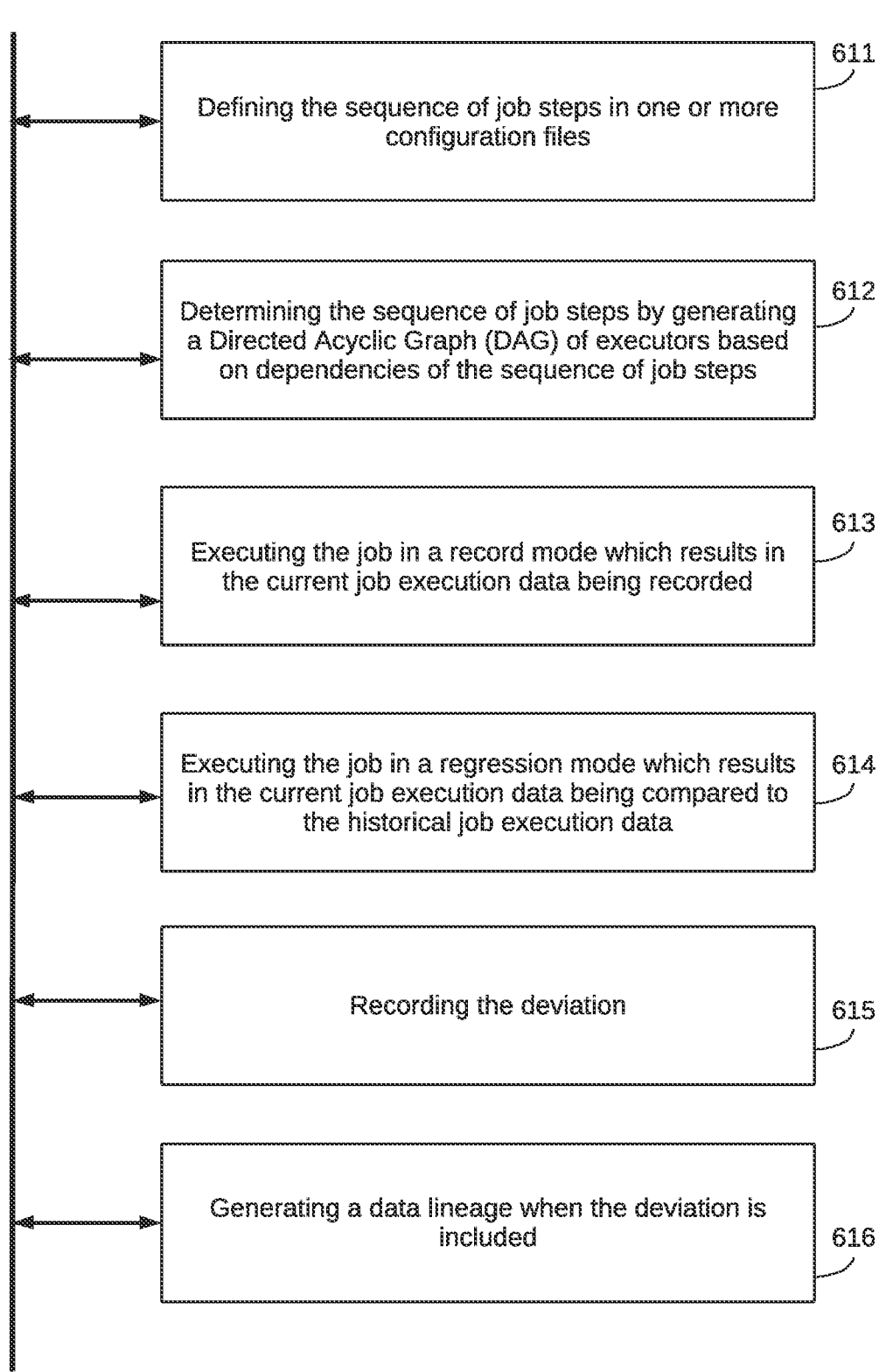

611

Defining the sequence of job steps in one or more configuration files

612

Determining the sequence of job steps by generating a Directed Acyclic Graph (DAG) of executors based on dependencies of the sequence of job steps

613

Executing the job in a record mode which results in the current job execution data being recorded

614

Executing the job in a regression mode which results in the current job execution data being compared to the historical job execution data

615

Recording the deviation

616

Generating a data lineage when the deviation is included

700     FIG. 7
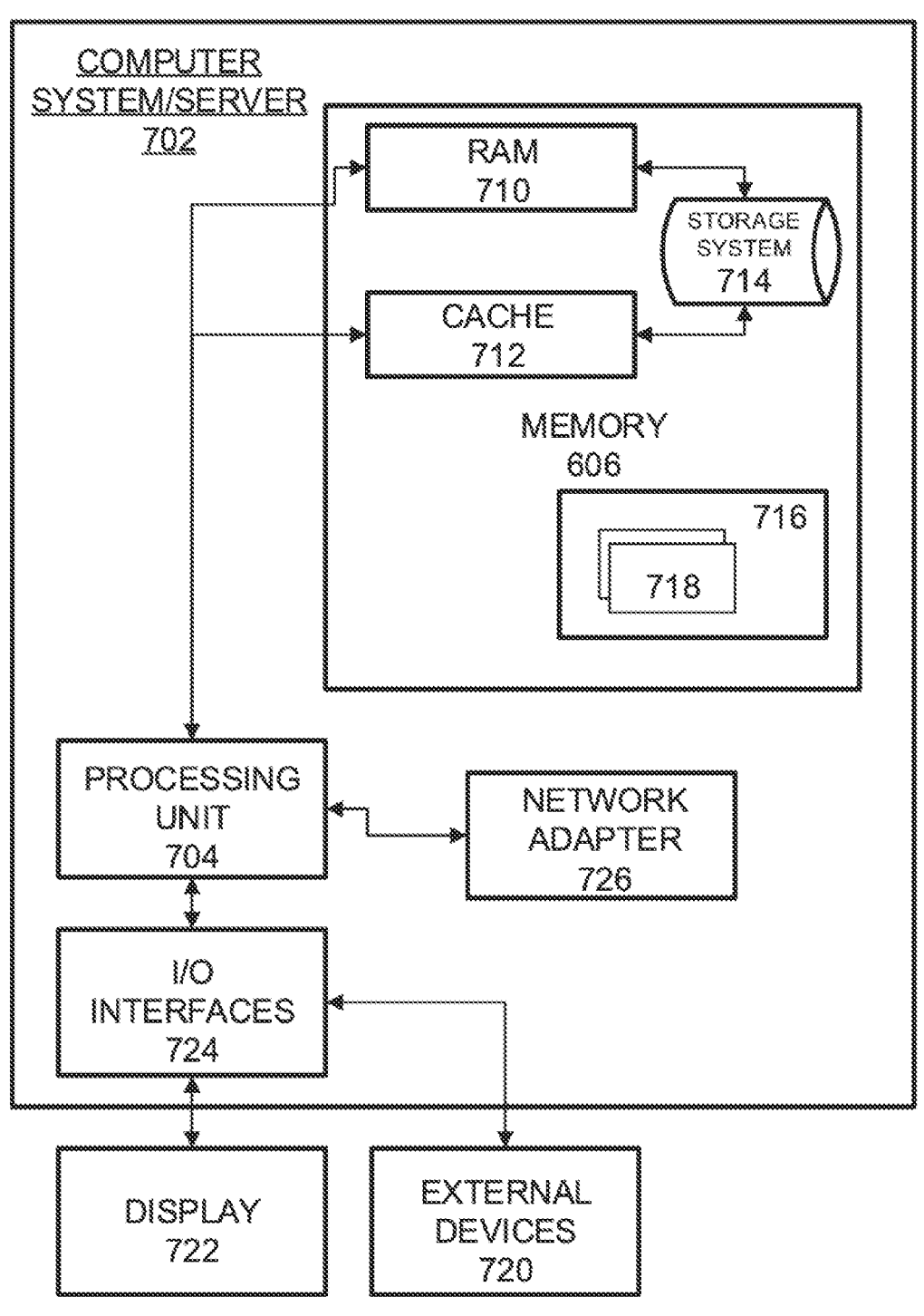

DATA PROCESSING PIPELINE WITH DATA REGRESSION FRAMEWORK

BACKGROUND

In computing, a pipeline, or data processing pipeline, refers to a set of data processing elements, where the output of one element is the input to the next element. A pipeline generally includes a source node of input data, a processing node that processes the input data, and a sink node which is a destination of the processed data.

SUMMARY

One example embodiment provides a system that includes a data store configured to store historical job execution data of a data processing pipeline and a processor communicatively coupled to the data store, wherein the processor is configured to perform at least one of a following step: execute a sequence of job steps for a job via a sequence of job step executors within the data processing pipeline, record current job execution data generated by the sequence of job step executors during the execution of the sequence of job steps, determine whether the execution of the sequence of job steps includes a deviation based on a comparison of the current job execution data to the historical job execution data, wherein the deviation is determined by a comparison of a current step execution dataset to a recorded step execution dataset in the data store, and generate a failure alert when the deviation is included.

Another example embodiment provides a method that includes one or more of executing a sequence of job steps for a job by a sequence of job step executors within a data processing pipeline, recording current job execution data generated by the sequence of job step executors during the executing of the sequence of job steps, determining whether the executing of the sequence of job steps includes a deviation based on comparing the current job execution data to historical job execution data of the data processing pipeline stored in a data store, wherein the deviation is determined by comparing a current step execution dataset to a recorded step execution dataset in the data store, and generating a failure alert when the deviation is included.

A further example embodiment provides a non-transitory computer storage medium comprising instructions that when read by a processor, causes the processor to perform one or more of: executing a sequence of job steps for a job by a sequence of job step executors within a data processing pipeline, recording current job execution data generated by the sequence of job step executors during the executing of the sequence of job steps, determining whether the executing of the sequence of job steps includes a deviation based on comparing the current job execution data to historical job execution data of the data processing pipeline stored in a data store, wherein the deviation is determined by comparing a current step execution dataset to a recorded step execution dataset in the data store, and generating a failure alert when the deviation is included.

BRIEF DESCRIPTION OF THE DRAWINGS

FIG. 3A-3B are diagrams that illustrate processes of configuration and execution of the data processing pipeline in a recording mode according to example embodiments.

FIGS. 4A-4B are diagrams that illustrate processes of configuration and execution of the data processing pipeline in a regression mode according to example embodiments.

FIGS. 6A-6B are flow diagrams according to example embodiments.

FIG. 7 is a diagram illustrating a computing system that may be used with any of the example embodiments described herein.

DETAILED DESCRIPTION

Figure 1:
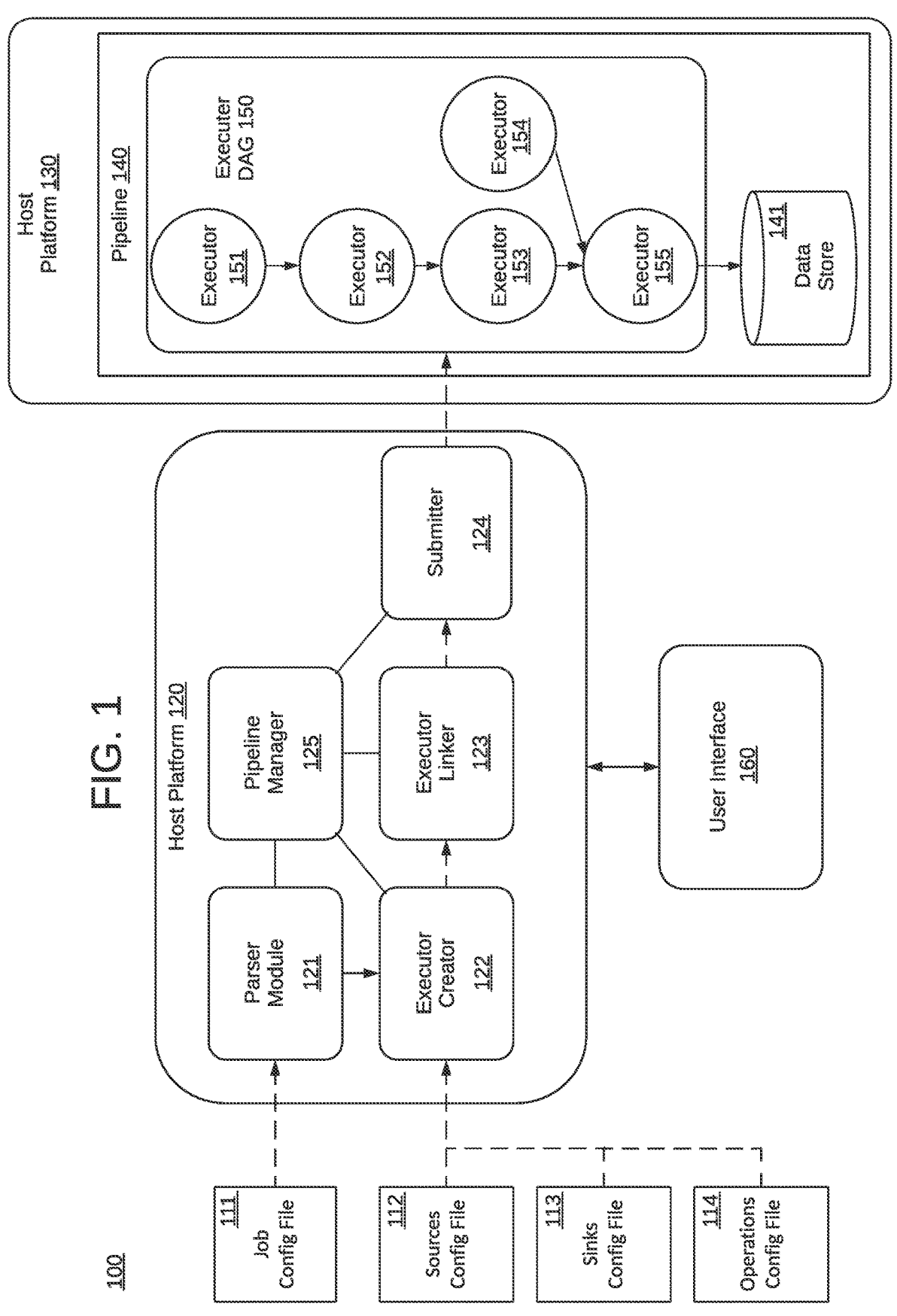
FIG. 1 is a diagram illustrating a computing environment of a data processing pipeline according to example embodiments.

It is to be understood that the embodiments described or depicted in this disclosure can be configured and performed in a variety of networks, including cloud computing, with various wired and wireless connections, direct or indirect connections, utilizing various protocols and computing devices. These embodiments are capable of being implemented in conjunction with any type of computing or networking environment now known or later developed.

The example embodiments describe a framework for a data processing pipeline that enables job creation using a low code methodology by using configuration files. In some embodiments, JavaScript Object Notation (JSON) can be used as the configuration format. A job defines a series of steps for extracting data from one or more sources, transforming the extracted data from previous steps, and storing the transformed data in one or more data stores. The steps performed by a job and the dependencies between those steps may be stored in configuration files. A particular job is initiated by passing a job code to the framework which accesses a related job configuration file that includes identifiers of the processing steps to be performed. In a normal execution mode, the pipeline executes the series of steps defined by the job. The jobs may be initiated manually, may be triggered through a scheduler, or the like.

In a recording mode, the pipeline records a step execution dataset for each execution of each step of a job. A recorded step execution dataset may include, but is not limited to, the data that is input to a step, output by a step, or the like. In some embodiments, the step execution dataset is stored in a pipeline data store.

In a regression mode (or a compare mode), the processing pipeline collects a step execution dataset for each execution of each step of a job. In one embodiment, it compares a collected step execution dataset from the current job execution with a recorded step execution dataset of a previous job execution. For example, the step execution dataset captured during the regression mode may be compared to a step execution dataset captured during the recording mode. In this way, the previously captured data may be used to validate the data of the current processing iteration. If the two datasets do not match, the processing pipeline may determine an error has occurred and send an error message or other notification to a pipeline management entity or user interface associated with the processing pipeline. This error message may be displayed on the user interface and may include various details about the error such as error type, and the like.

The framework may also provide a user interface that enables a user to set the mode of operation of the processing pipeline for a given job. For example, a user may input a command via various input mechanisms on the user interface to switch the processing pipeline from a normal mode of operation to a recording mode of operation for a particular job. As another example, the user may input a command on an input mechanism to cause the mode of operation to switch from the recording mode of operation to a regression mode of operation. In other embodiments, the processing pipeline can automatically switch between modes based on a completion of data being processed in a previous mode.

FIG. 1 illustrates a computing environment 100 of a processing pipeline 140 according to example embodiments. Referring to FIG. 1, management components of the processing pipeline 140 are hosted by host platform 130, which may be a cloud platform, web server, virtual machine, or the like. The processing pipeline 140 may include a data store 141 that can be used to store data associated with pipeline execution. The pipeline management host, host platform 120, includes a pipeline manager 125, which may be a software application or a suite of software applications, which is able to configure the processing pipeline 140 of the host platform 130. In particular, the pipeline manager 125 can configure jobs that may be run on the processing pipeline 140 based on configuration files 111-114, which may be JSON files or the like. The configuration files 111-114 may be stored in a file system or can be packaged with an application code artifact. Though depicted as distinct, in some embodiments, host platforms 120 and 130 can be configured as a single platform and may be any of the computer systems/servers described or depicted herein.

When the pipeline manager 125 receives a start job request that includes a job code identifier, it locates the associated configuration for the job based on that identifier. In some embodiments, this request is initiated manually via a user interface 160 appearing on a display of a device containing a processor and/or memory (such as a cell phone, watch, personal computer, laptop, any of the computer systems/servers described or depicted herein, and the like). In other embodiments, the start request may be initiated by an automatic scheduling system (not shown). The job configuration defines the steps to be executed. In some embodiments, the job configurations are stored in a job config file 111. The step definitions further link to corresponding configuration files related to the steps. For example, sources configuration file 112 may include instructions for configuring one or more data source(s) of the processing pipeline, the sinks configuration file 113 may include instructions for configuring one or more data sink(s) of the processing pipeline, and the operations configuration file 114 may include instructions for configuring one or more data transformation operations within the processing pipeline 140.

In the example of FIG. 1, the host platform 120 includes a parser or a parser module 121, an executor creator or an executor creator module 122, an executor linker or an executor linker module 123, and a submitter or a submitter module 124. Each of the modules 121-124 may be managed or controlled by the pipeline manager 125. The pipeline manager 125 uses the parser module 121 to parse configuration file 111 to identify a type of job to be performed based on a particular job code identifier. The parser module extracts the step definitions for the target job. These step definitions include an identifier and one or more dependencies to other step(s) in the job definition. In one embodiment, a dependency is expressed as a predecessor step identifier. In another embodiment, a dependency is expressed as a successor step identifier. Once parsing is complete, the list of steps is returned to the pipeline manager 125.

The pipeline manager 125, then requests that an executor creator module 122 create a list of corresponding executors, in accordance with the supplied list of steps. An executor is software that performs desired step operations given the appropriate input which may include, but is not limited to, configuration in the configuration files 111-114 and output from the previous steps or executors (which may be, for example, Java classes). Executors support a variety of operations including, but not limited to source, sink, transform, convert, aggregate, and join. The executor creator 122 determines the type of executor required based on the step definition provided. The executor creator 122 creates the executors 151-155 that are passed to the processing pipeline 140 to execute the job and step configuration data, including dependency relationships, are supplied to the executors. During the executor creation process, the executor creator 122 may utilize configuration files 111-114 to configure the executors it creates.

Upon receiving the list of executors, the pipeline manager 125 sends the list of executors 151-155 to an executor linker module 123 which generates a Directed Acyclic Graph (DAG) 150, which is a representation of a series of activities, of the executors 151-155 based on their configuration, which includes dependencies (predecessor, successor, etc.) on the other executors. Once the executer DAG 150 is created, the executor linker 123 understands the data flow so it can configure the inputs and/or outputs of the different executors accordingly. Once created, the executor DAG 150 is returned to the pipeline manager 125 in response to a request from the pipeline manager 125.

The pipeline manager 125 then passes the executor DAG 150 to a submitter module 124, which utilizes an appropriate pipeline API for execution on the target processing pipeline 140.

In some embodiments, a user interface 160 is provided for interaction with the pipeline management host platform 120 and/or the components running on it 121-125, as well as the other components in the system 100. In some embodiments, the pipeline manager 125 initiates the interaction with the user interface 160. In some embodiments, the user interface 160 may initiate a request to start a job and the user interface may request and receive job status updates. In some embodiments, the user interface can request visualization data that reflects the executor DAG 150.

Figure 2A:
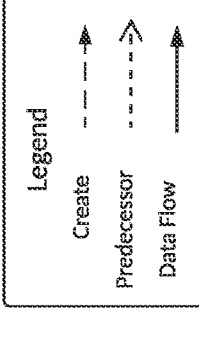
FIGS. 2A-2C are diagrams illustrating processes of configuring a data processing pipeline in a normal execution mode according to example embodiments.
Figure 2B:
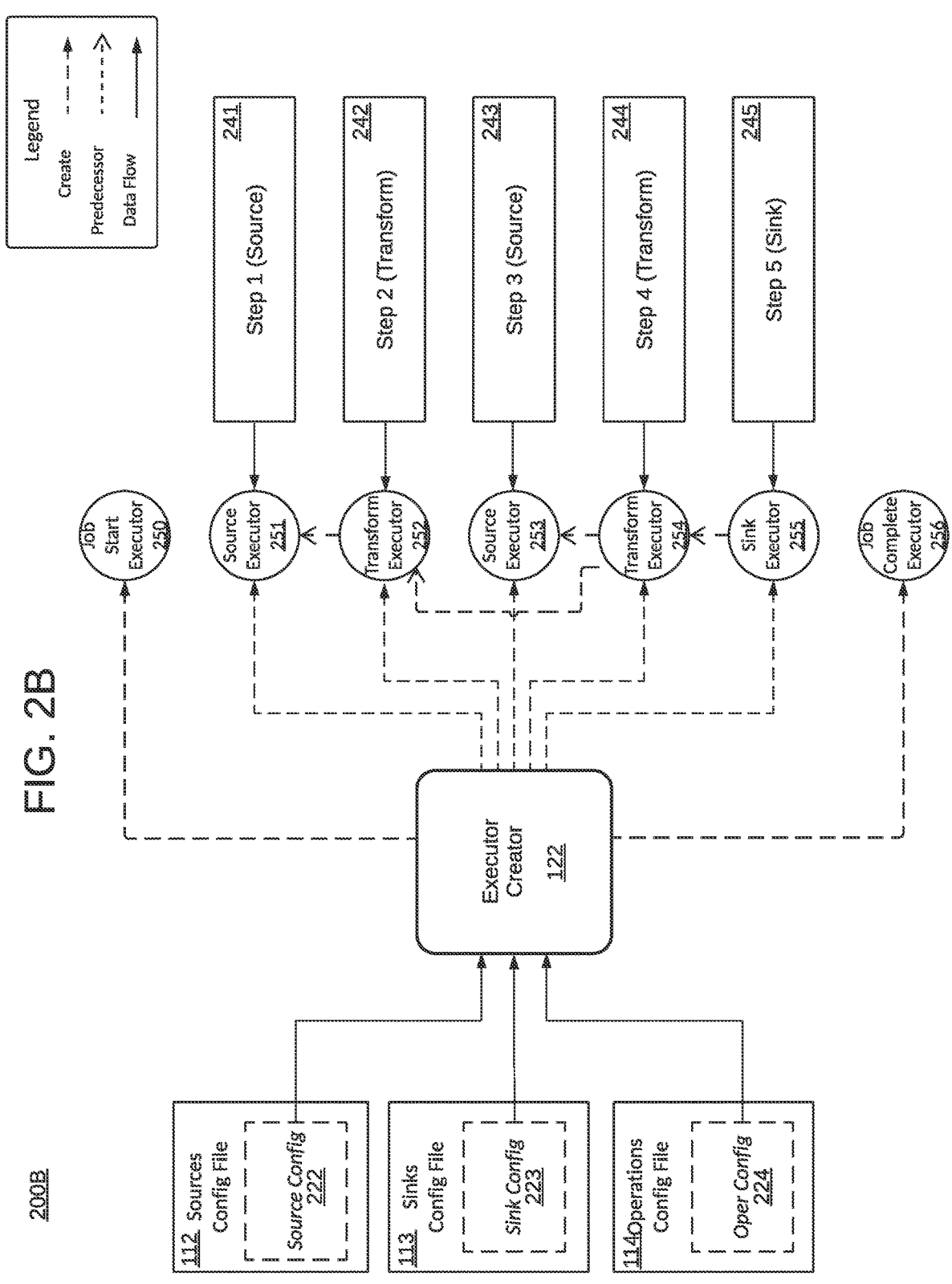
Figure 2C:
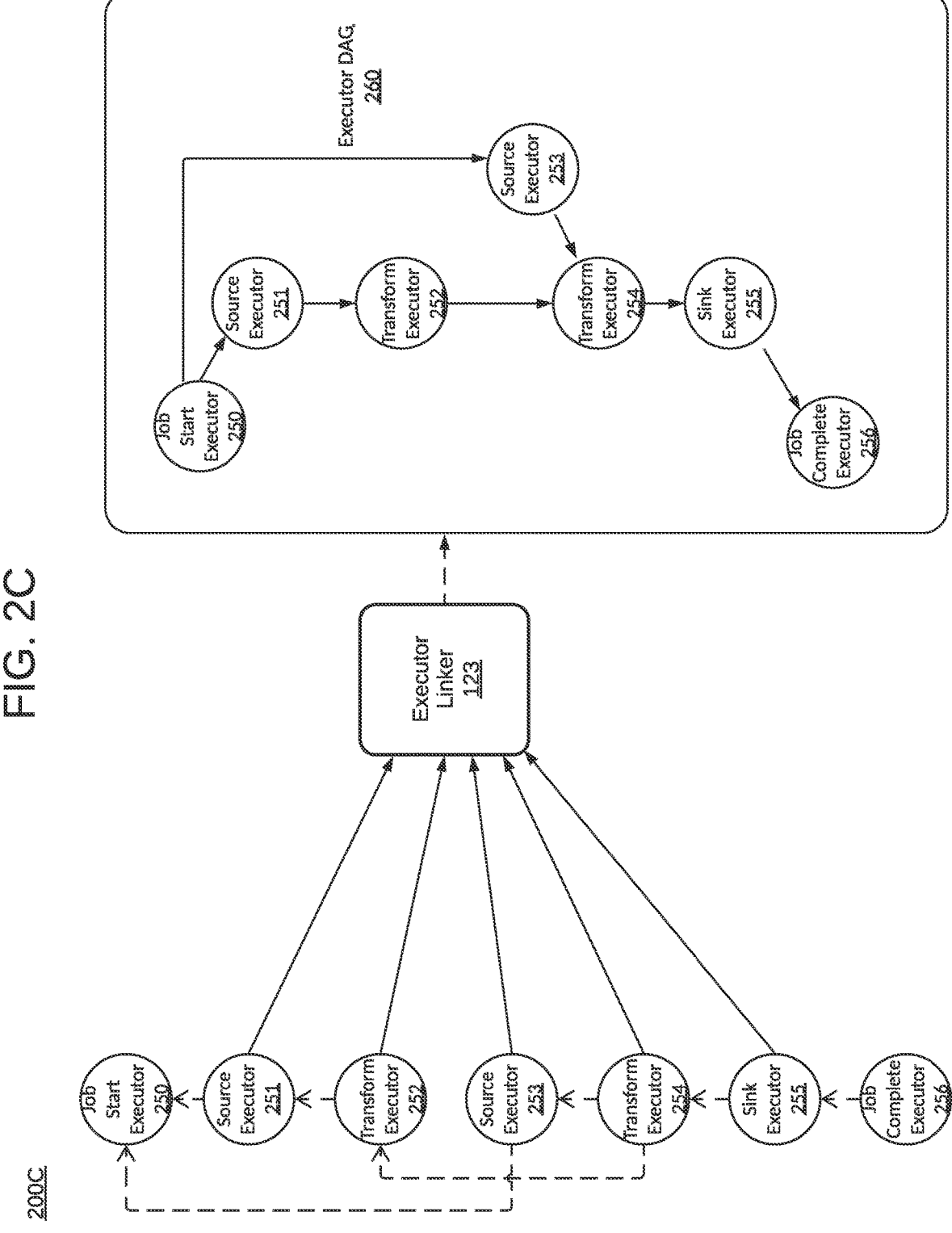

FIGS. 2A-2C are diagrams illustrating processes for configuring a data processing pipeline in a normal execution mode according to example embodiments. The legend included in FIGS. 2A and 2B are applicable to the remaining diagrams in the application but is not included in all diagrams due to space constraints. FIG. 2A illustrates a process 200A of the parser module 121 (see FIG. 1) creating a list of steps for a job identified by a supplied job code during a start job operation. In some embodiments, the request originates from the pipeline manager 125 (See FIG. 1). Using the supplied job code, the job config 222 is located in the job config file 111. The job config 222 contains a series of step configs 232 that describe the steps that make up the job. Each step config 232 contains a step identifier which can be referenced by other steps in the job using a dependency field. In some embodiments, dependencies are expressed as a list of predecessor step ids. A step also has a type indicating the type of operation to be performed. There are various predefined step types including, but limited to source, sink, transform, convert, aggregate, and join. Further, the step config 232 may include cross-references to other configuration files such as the sources configuration file 112 described in FIG. 1.

The parser module 121 parses each step config 232 and creates a list of steps for the pipeline manager 125 that reflect the data contained in the step configs 232. In this embodiment, by example only, five steps are created with various dependencies, but embodiments are not limited thereto. The order of the step list may not reflect the order in which the steps are ultimately executed in the pipeline 140 as the order is determined by the linker 123 and by the pipeline 140 later in the process.

FIG. 2B illustrates a process 200B of the executor creator 122 generating a list of executors upon request, given a list of job steps (241-245). In some embodiments, this request initiates from the pipeline manager 125 as part of a start job operation. Referring to FIG. 2B, the process 200B reflects a normal pipeline execution mode, not a record or regression mode as those modes require different pipeline management behavior. In addition to the supplied list of steps, the executor creator may utilize configuration files 112-114 and the configuration data within them 222-224 to create the job step executors 251-255. For example, when creating a source executor, the sources configuration file 112 may be consulted to resolve the data source referenced by the corresponding step. In such a case, the data source may be a particular database table residing in a specific database server accessible using certain login credentials. Once all resolutions are complete, the qualified step configuration data is stored in the corresponding executor for use during pipeline execution. The step type determines the type of executor that is instantiated. As with steps, a predefined set of executors exist including but not limited to, source, sink, transform, convert, aggregate, join, record, and validate. The dependencies between steps 241-245 are also configured as dependencies between the executors 251-255.

In addition to the job step executors 251-255, two further executors are created to manage job start and completion. A job start executor 250, configured as a predecessor to all job step executors 251-255, stores the initial job execution information in the pipeline data store 141. The information stored includes, but is not limited to, a job code, start time, a unique job execution identifier, and initial job status. In some embodiments, the job start executor 250 initializes one or more configuration placeholders to reflect execution time resources such as database identifiers, files, etc. In some embodiments, the job start executor 250 initializes one or more caches used by the job or finalizes the execution path of the job. Further, a job complete executor 256, configured as a successor to all job step executors 251-255, stores the final job execution information in the pipeline data store 141. The information stored includes, but is not limited to, a job completion time, a final job status, record counts, and failure counts. In some embodiments, the functions of the job start executor 250 are spread across a group of executors that have dependency relationships with each other. In other embodiments, the functions of the job complete executor 256 are spread across a group of executors that have dependency relationships with each other.

Once all executors have been created, the list of executors 250-256 is returned. This information is needed by the executor linker 123 to build the executor DAG 150 that can be executed by the pipeline 140.

FIG. 2C illustrates a process 200C of the executor linker 123 generating a job step executor Directed Acyclic Graph (DAG) 260 upon request given a list of executors (250-256). In some embodiments, this request initiates from the pipeline manager 125 (See FIG. 1) as part of a start job operation. The linker 123 generates the DAG 260 of the executors (250-256) based on their configuration, which includes dependencies (predecessor, successor, etc.) on the other executors. Once the DAG is created, the linker understands the data flow so it can configure the inputs/outputs of the different executors accordingly. Upon completion of this task, fully realized executor DAG 260 is returned to the requesting entity (i.e., the pipeline manager 125). In the case of a start job operation, the executor DAG 260 is then supplied by the pipeline manager 125 to the submitter 124 (See FIG. 1) to initiate the execution of the job in the pipeline 140. In this embodiment, the DAG 260 shows that after the job start executor 250, executor 251 or 253 may execute next. In some embodiments, they may execute in parallel. The determination of execution order is driven by the executor DAG 260 along with one or more of the following: additional job configuration, pipeline 140 (See FIG. 1) configuration, pipeline 140 capabilities, and pipeline host 130 resource availability. Regardless of the other drivers, the executor DAG 260 ensures that a correct execution order is followed.

Figure 3A:
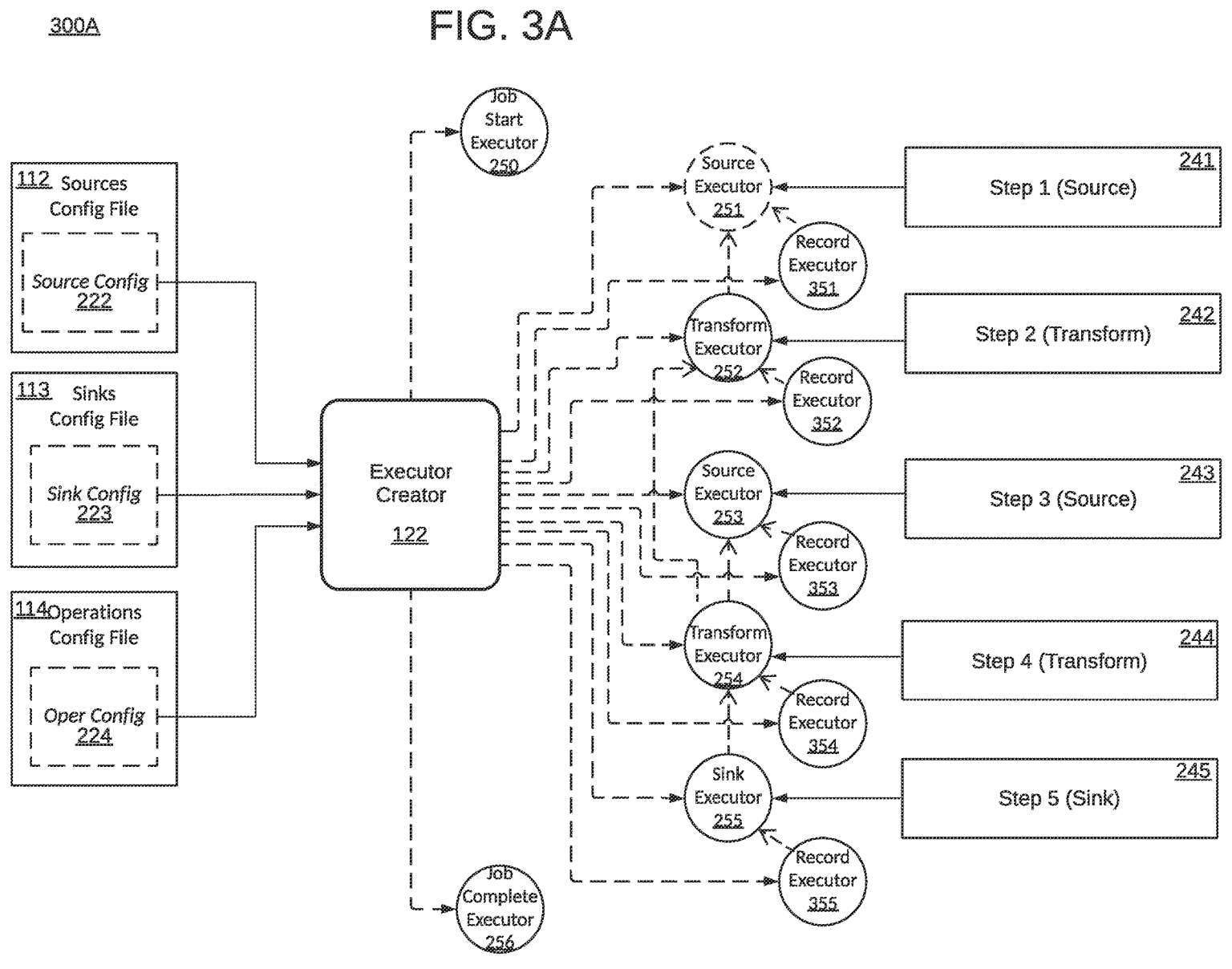
Figure 3B:
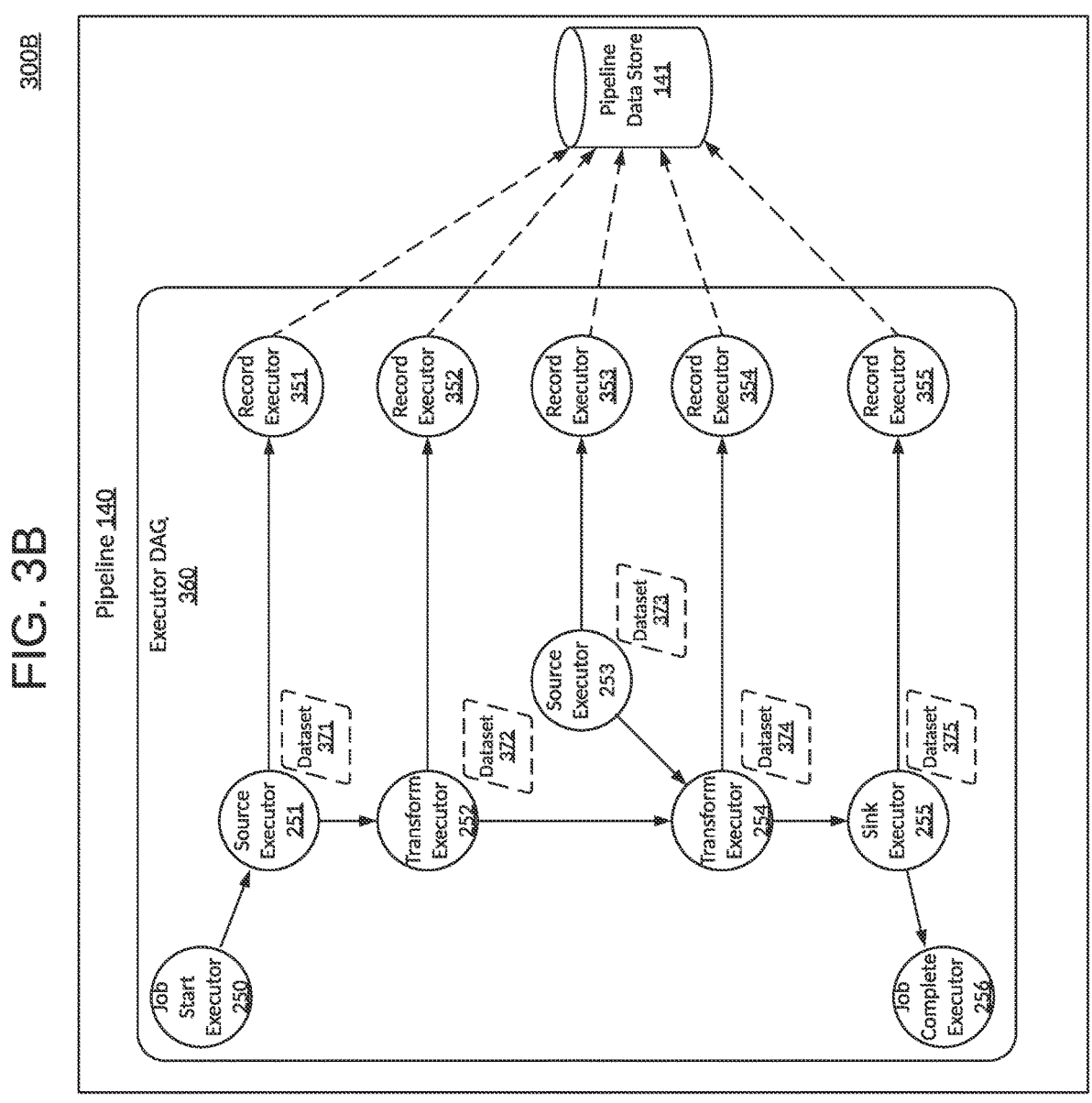

FIGS. 3A-3B are diagrams illustrating processes for configuring and executing a data processing pipeline in record mode according to example embodiments. To enable a record mode in the data processing pipeline, the configuration process described in FIGS. 2A-2C is slightly modified. The step creation process described in FIG. 2A remains unchanged as the steps 241-245 (See FIG. 2A) required to run the job are not altered. The process 200B described in FIG. 2B however is changed to support recording.

FIG. 3A illustrates a process 300A of the executor creator generating a list of executors upon request given a list of job steps (241-245) along with a recording mode option. In some embodiments, this request initiates from the pipeline manager 125 (See FIG. 1) as part of a start job operation. In some embodiments, the recording mode option includes the identity of or a path to a destination data store. In some embodiments, the destination data store may be a data store in the pipeline 141. In other embodiments the destination data store may be a database. In some embodiments, the destination data store may be a data stream. As described before, in addition to the supplied list of steps, the executor creator may utilize configuration files 112-114 and the configuration data within them 222-224 to create the executors 251-255. Also, specialized job start and job complete executors 250 and 256 are created. Further, given that the recording mode has been included in the request, an additional record executor 351-355 is created for each job step executor 251-255. In some embodiments, the identity of or path to a destination data store is configured in the recording executor 351-355. Each recording executor 351-355 includes a predecessor dependency on its corresponding job step executor 251-255. This ensures the associated job step executor 251-255 completes, and therefore its output is available (for recording) before the corresponding recording executor 351-355 executes. It should be understood that the record executors 351-355 execute in an incremental fashion as their corresponding job step executors 251-255 complete. For example, as data streams through the pipeline, when job step executor 251 completes processing an input dataset, the emitted output dataset is then processed by the record executor 351. The response to the executor creation request includes the job step executors 251-255 and the corresponding record executors 351-355. When these are provided to the linker 123 (See FIG. 1), the behavior of the linker 123 described in 200C in FIG. 2C is unchanged as all executors are treated the same. However, in this recording mode embodiment, the linker 123 generates a different executor DAG than the executor DAG 260 as it also includes the recording executors 351-355.

FIG. 3B illustrates a process 300B of a job with recording mode enabled executing in a pipeline 140 (See FIG. 1 and FIG. 3B). In this embodiment the job has an executor DAG 360 which contains a list of job step executors 251-255 and a corresponding list of record executors 351-355. When a job step executor 251-255 completes its corresponding record executor 351-355 is scheduled to run. In some embodiments, a record executor is configured to persist data into a local pipeline data store 141. In some embodiments, a record executor is configured to persist data into a database. In other embodiments, a record executor is configured to persist data into a filesystem. In some embodiments, a record executor is configured to insert data into a data stream. When the record executor 351-355 runs, it persists a step execution dataset 371-375 from its associated job step executor 251-255 into the target data store 141 in this embodiment. The step execution dataset 371-375 may include but is not limited to, the job code identifier, the step identifier, an execution identifier, start timestamps, stop timestamps, input values, and output values.

Figure 4A:
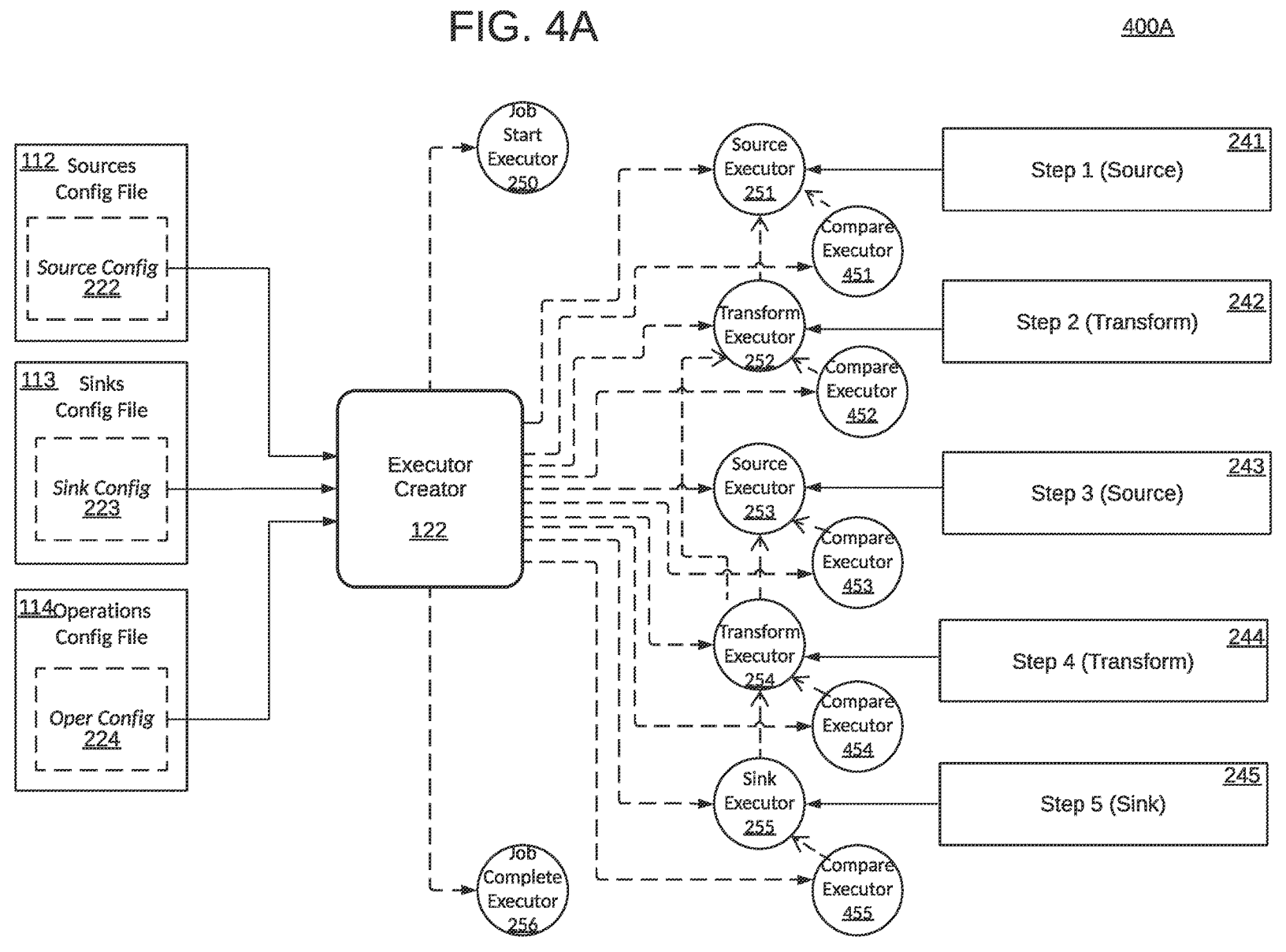
Figure 4B:
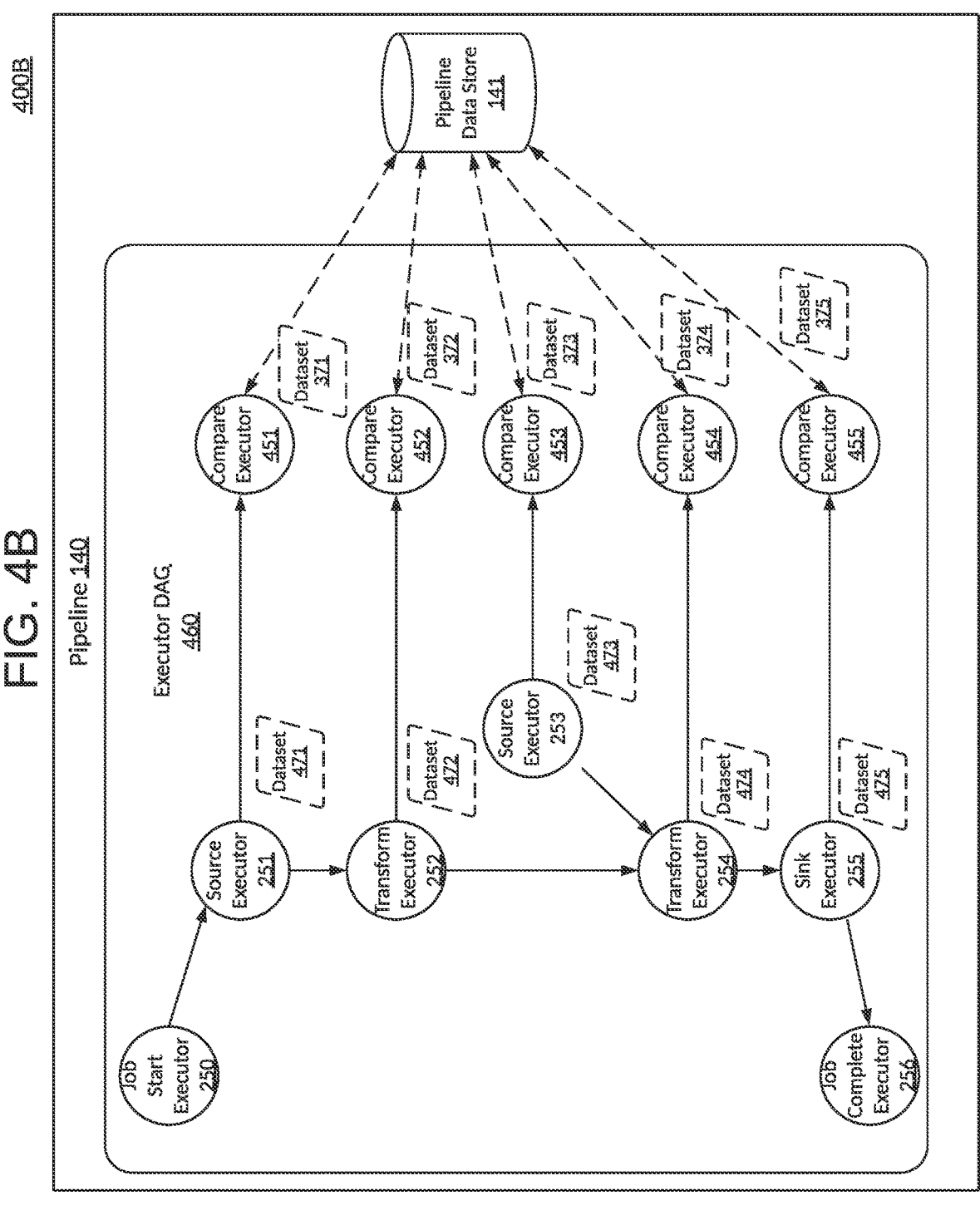

FIGS. 4A-4B are diagrams illustrating processes for configuring and executing a data processing pipeline in regression mode according to example embodiments. To enable a regression mode in the data processing pipeline, the configuration process described in FIGS. 2A-2C is slightly modified. The step creation process described in FIG. 2A remains unchanged as the steps 241-245 (See FIG. 2A) required to run the job are not altered. The process 200B described in FIG. 2B however is changed to support regression validation.

FIG. 4A illustrates a process 400A of the executor creator generating a list of executors upon request given a list of job steps (241-245) along with a regression mode option. In some embodiments, this request initiates from the pipeline manager 125 (See FIG. 1) as part of a start job operation. In some embodiments, the regression mode option includes the identity of a data store used to previously record a job execution as described by processes 300A and 300B. In some embodiments, the regression mode option includes an identifier of a previously recorded job execution. In some embodiments, this identifier is a filesystem path to the recording. In other embodiments, the identifier includes a job code identifier and an execution identifier. In some embodiments, the lack of a previous recording identification implies the last recorded execution of the job.

In some embodiments, the regression mode option includes additional behavior configuration. In an embodiment, the additional behavior configuration includes a notification option. In one embodiment the notification option directs notifications to the pipeline manager 125 (See FIG. 1). In another embodiment the notification option directs notifications to the user interface 160 (See FIG. 1). In some embodiments, the additional behavior configuration includes an option for gathering additional metadata from the pipeline manager 125 to aid in debugging.

As described before, in addition to the supplied list of steps, the executor creator may utilize configuration files 112-114 and the configuration data within them 222-224 to create the executors 251-255. Also, specialized job start and job complete executors 250 and 256 are created. Further, given that the regression mode has been included in the request, an additional compare executor 451-455 is created for each job step executor 251-255. In some embodiments, the additional behavior configuration is stored in the compare executor 451-455. The compare executor 451-455 retrieves execution data from a previously recorded job execution, compares the values with the current values, records any deviation encountered and optionally alerts said deviation. Each compare executor 451-455 includes a predecessor dependency on its corresponding job step executor 251-255. This ensures the associated job step executor 251-255 completes, and therefore its output is available (for comparison) before the corresponding compare executor 451-455 executes. It should be understood that the compare executors 451-455 execute in an incremental fashion as their corresponding job step executors 251-255 complete. For example, as data streams through the pipeline, when job step executor 251 completes processing an input dataset, the emitted output dataset is then processed by the compare executor 451. The response to the executor creation request includes the job step executors 251-255 and the corresponding compare executors 351-355. When these are provided to the linker 123 (See FIG. 1), the behavior of the linker 123 described in 200C on FIG. 2C is unchanged as all executors are treated the same. However, in this regression mode embodiment, the linker 123 generates a different executor DAG than the executor DAG 260 (See FIG. 2C) as it also includes the compare executors 451-455. In other embodiments, the deviation recording and/or optional notification behavior is not handled directly by the compare executor (451-455) but is instead implemented by a deviation executor (not shown) that is created and dependent on a corresponding compare executor 451-455.

FIG. 4B illustrates a process 400B of a job with regression mode enabled executing in a pipeline 140 (See FIG. 1 and FIG. 4B). In this embodiment the job has an executor DAG 460 which contains a list of job step executors 251-255 and a corresponding list of compare executors 451-455. When a job step executor 251-255 completes its corresponding compare executor 451-455 is scheduled to run. When the compare executor 451-455 runs, it retrieves a historical job step execution dataset 371-375 from the data store 141 (See FIG. 1 and FIG. 4B) in this embodiment. In other embodiments, the data may be retrieved from one or more of a database or a filesystem. The appropriate dataset to retrieve may be determined by but is not limited to, the job code identifier, the step identifier, and/or a job execution identifier. The step execution dataset 371-375 retrieved may include but is not limited to start timestamps, stop timestamps, input values, and output values. The historical step execution dataset is compared against the current step execution dataset 471-475 provided by the associated job step executor 451-455. In some embodiments, one or more fields of a historical dataset 371-375 are compared against an equivalent one or more fields in a current step execution dataset 471-475. In some embodiments, the comparison allows a range of values. In this embodiment, if a deviation is detected then it is recorded in the pipeline data store 141. In other embodiments, the deviation may be recorded in one or more of a database, a data stream, or a filesystem. In some embodiments, the pipeline manager 125 (See FIG. 1 and FIG. 4B) may be notified of a deviation as soon as it is detected. In some embodiments, user interface 160 (See FIG. 1) may be notified of a deviation as soon as it is detected. In some embodiments, the compare executor 451-455 may request additional metadata from the pipeline manager 125 about the dataset involved in the deviation. In one embodiment, the additional metadata is a data lineage. In some embodiments, that additional metadata is recorded in the data store 141.

In some embodiments, the job complete executor 256 detects one or more deviations in the job execution after the job is completed. In some embodiments, the job complete executor 256 raises a failure notification when the job is completed if one or more deviations exist. In some embodiments, the job complete executor 256 may request additional metadata from the pipeline manager 125 about the job if one or more deviations exist. In one embodiment, the additional metadata is a data lineage. In another embodiment, the additional metadata is a list of recent version-control system updates which include changes to version-controlled files utilized by the job such as, but not limited to job configuration files and executor source files. In some embodiments, the additional metadata is recorded in the data store 141 along with the execution data.

Figure 5:
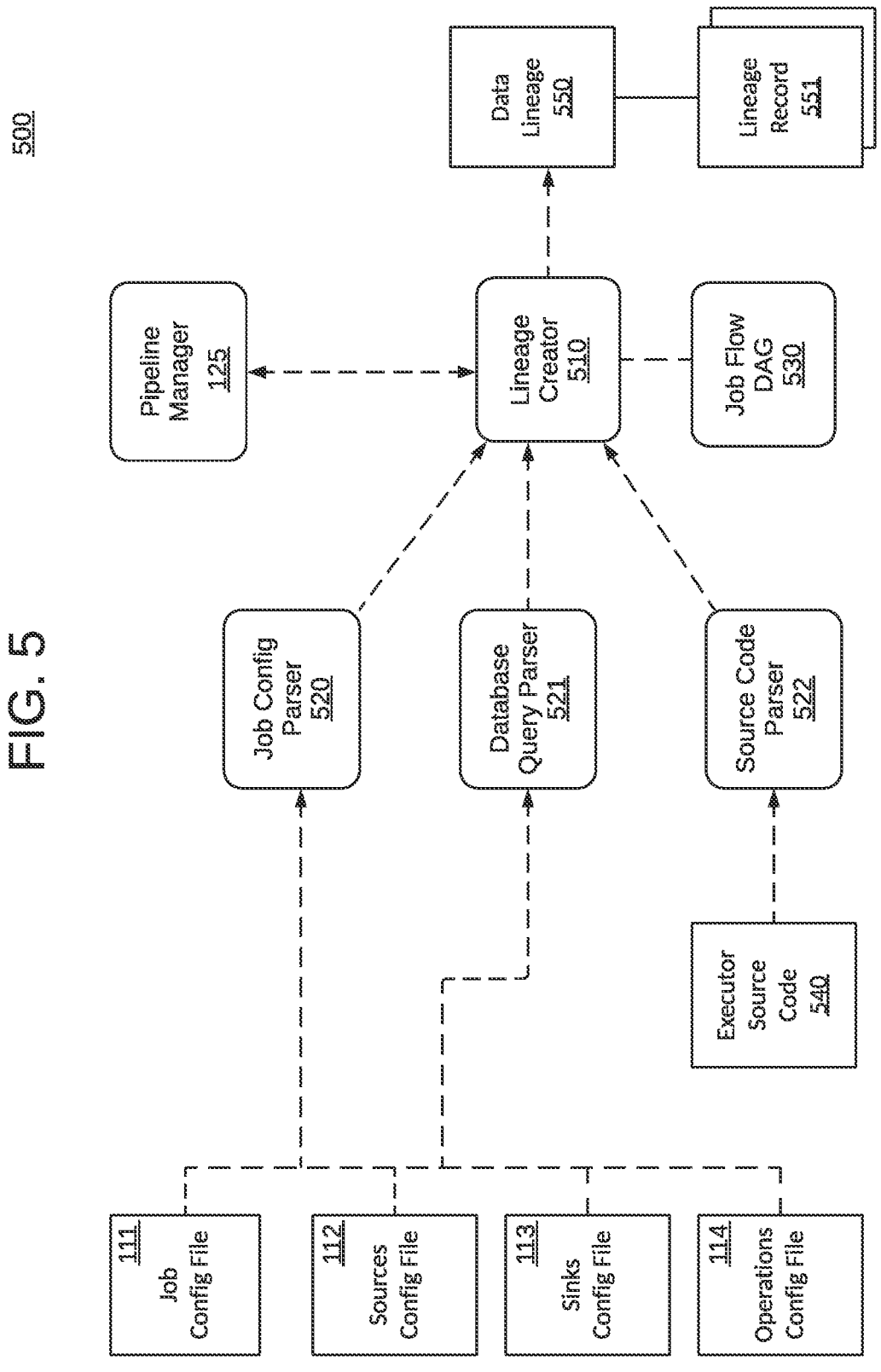
FIG. 5 is a diagram illustrating a process of generating a data lineage.

FIG. 5 illustrates a process 500B for generating a data lineage. In this embodiment, a lineage creator 510 receives a request to generate a data lineage for a job. In one embodiment, the request is for a specific data field being modified by a specified job. In some embodiments the request is initiated by the pipeline manager 125 (See FIGS. 1 and 5). In some embodiments, the request includes a desired output format.

When the lineage creator 510 receives a create lineage request that includes a job code identifier, it locates the associated configuration for the job based on that identifier. The job configuration defines the steps to be executed. In some embodiments, the job configurations are stored in a job config file 111. The step definitions further link to corresponding configuration files related to the steps. For example, configuration file 112 may include instructions for configuring one or more data source(s) of the processing pipeline, the configuration file 113 may include instructions for configuring one or more data sink(s) of the processing pipeline, and the operations configuration file 114 may include instructions for configuring one or more data transformation operations.

At this point, the lineage creator utilizes a job configuration parser 520 to identify a type of job on which the data lineage shall be generated based on the supplied job code identifier. The parser 520 extracts the step definitions for the target job. These step definitions include an identifier and one or more dependencies to other step(s) in the job definition. In one embodiment, a dependency is expressed as a predecessor step identifier. In another embodiment, a dependency is expressed as a successor step identifier. Once parsing is complete, the list of steps is returned to the lineage creator.

The lineage creator 520 constructs a job flow DAG 530 of the various job steps based on the dependencies between the steps. The lineage creator 520 locates the final or target step in the job. In some embodiments, the target step is not the final job step. For example, if a data lineage is requested for a particular data field, the last recording of that field may take place before the final step.

Once the target step in the data flow DAG 530 has been identified, a data lineage 550 is created. At this point, in this embodiment, the lineage creator 510 traverses the flow backward capturing all of the steps along the way into data lineage records 551 and associates them with the data lineage 550. In some embodiments, the lineage creator 510 utilizes the job configuration parser 520 to capture the metadata about each step found in configuration files 111-114. In some embodiments, the lineage creator 510 utilizes a database query parser 521 to capture details of database queries embedded in configuration files 111-114. In some embodiments, the database query parser 521 is a SQL parser. In some embodiments, multiple database query parsers 521 are employed given the database-specific SQL variants. In some embodiments, a source code parser 522 is utilized to capture the transformations taking place in executor 151-155

(see FIG. 1) source code (classes) 540. In some embodiments, the source code parser 522 is a Java parser.

In some embodiments, once the data lineage 550 is captured, it is converted into the requested output format before being returned. In some embodiments, that output format is a tuple format supported by visualization tools. In some embodiments, the tuple format is a triplet representing a tree node structure.

FIG. 6A is a flow diagram that illustrates a method 600A of a data processing pipeline with a data regression framework according to example embodiments. The method 600A may include one or more of executing a sequence of job steps for a job by a sequence of job step executors within a data processing pipeline 601, recording current job execution data generated by the sequence of job step executors during the executing of the sequence of job steps 602, determining whether the executing of the sequence of job steps includes a deviation based on comparing the current job execution data to historical job execution data of the data processing pipeline stored in a data store, wherein the deviation is determined by comparing a current step execution dataset to a recorded step execution dataset in the data store 603, and generating a failure alert when the deviation is included 604.

FIG. 6B is a flow diagram that illustrates a method 600B of a data processing pipeline with a data regression framework according to other example embodiments. The method 600B may include one or more of defining the sequence of job steps in one or more configuration files 611, determining the sequence of job steps by generating a Directed Acyclic Graph (DAG) of executors based on dependencies of the sequence of job steps 612, executing the job in a record mode which results in the current job execution data being recorded 613, executing the job in a regression mode which results in the current job execution data being compared to the historical job execution data 614, recording the deviation 615, and generating a data lineage when the deviation is included 616.

Although the steps in FIGS. 6A and 6B are depicted and described in a particular order, they can occur in any order and more than one time with the example embodiments described herein. Further, one or more of the depicted and described steps may be temporarily or permanently omitted with the example embodiments described herein.

The above embodiments may be implemented in hardware, in a computer program executed by a processor, in firmware, or in a combination of the above. A computer program may be embodied on a computer-readable medium, such as a storage medium or a non-transitory computer storage medium.

For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

FIG. 7 illustrates an example system 700 that supports one or more of the example embodiments described and/or depicted herein. The system 700 comprises a computer system/server 702, which is operational with numerous other general purpose or special purpose computing system environments or configurations. Examples of computing systems, environments, and/or configurations that may be suitable for use with computer system/server 702 include, but are not limited to, personal computer systems, server computer systems, thin clients, thick clients, hand-held or laptop devices, cell phones, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in the example system 700 is shown in the form of a computing device. The components of computer system/server 702 may include, but are not limited to, at least one of the depicted components including, for example, processors or processing units (processor 704), a system memory 706, and a bus that couples various system components including the system memory 706 to the processor 704. Although only a single computer system/server 702 is depicted, more than one computer system/server 702, whether directly connected or communicatively connected via a wired or wireless network, can be utilized with any of the example embodiments and with any of the components described or depicted herein.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. The system memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the system memory 706 may include at least one program product having a set (e.g., at least one) of program modules that are configured to carry out the functions of various embodiments of the application.

Program/utility 716, having a set (at least one) of program modules 718, may be stored in the system memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc., one or more devices that enable a user to interact with computer system/server 702, and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components and networks (including private and private cloud networks) could be used in conjunction with computer system/server 702. Examples include, but are not limited to devices containing a processor and/or memory (such as a cell phone, watch, personal computer, laptop, and the like), microcode, device drivers, redundant processing units, external disk drive arrays, RAID systems, tape drives, and data archival storage systems, etc.

Although an embodiment of at least one of a system, method, and non-transitory computer readable storage medium has been illustrated in the accompanying drawings and described in the foregoing detailed description, it will be understood that the application is not limited to the embodiments disclosed but is capable of numerous arrangements, rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium or a, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent. While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. A system, comprising:
a data store configured to store historical job execution data of a data processing pipeline; and
a processor communicatively coupled to the data store, wherein the processor is configured to:
receive a request from a pipeline manager executing on a host platform to execute a job comprising a sequence of job steps,
in response to the request, instantiating a sequence of job step executors within the data processing pipeline before execution of the job, wherein the instantiating comprises resolving dependencies of the job step executors in the sequence of job step executors,
record current job execution data generated by the sequence of job step executors during the execution of the job,
perform a comparison of a current job step execution dataset to the historical job execution data in the data store,
identify a deviation in the sequence of job steps based on the comparison, and
in response to the deviation being identified, generate a failure alert and capture metadata about a job step with the deviation from the pipeline manager;
wherein the sequence of job steps is determined using a Directed Acyclic Graph (DAG) of executors generated based on the dependencies of the job step executors.

2. The system of claim 1, wherein the sequence of job steps is defined in one or more configuration files.

3. The system of claim 1, wherein the DAG comprises recording executors that record the current job execution data.

4. The system of claim 1, wherein the DAG comprises compare executors that compare the current job step execution dataset to the historical job execution data.

5. The system of claim 1, wherein the processor is further configured to:
record the deviation.

6. The system of claim 1, wherein the processor is further configured to:
generate a data lineage in response to the deviation being identified.

7. A method, comprising:
receiving a request from a pipeline manager executing on a host platform to execute a job comprising a sequence of job steps;
in response to the request, instantiating a sequence of job step executors within the data processing pipeline before execution of the job, wherein the instantiating comprises resolving dependencies of the job step executors in the sequence of job step executors;

executing the sequence of job steps;

recording current job execution data generated by the sequence of job step executors when the job is executed;

comparing a current job step execution dataset to the historical job execution data in the data store;

identifying a deviation in the sequence of job steps based on the comparison; and in response to the deviation being identified, generating a failure alert and capture metadata about a job step with the deviation from the pipeline manager;

wherein the sequence of job steps is determined using a Directed Acyclic Graph (DAG) of executors generated based on the dependencies of the job step executors.

8. The method of claim 7, wherein the sequence of job steps is defined in one or more configuration files.

9. The method of claim 7, wherein the DAG comprises recording executors that record the current job execution data.

10. The method of claim 7, wherein the DAG comprises compare executors that compare the current job step execution dataset to the historical job execution data.

11. The method of claim 7, further comprising:

recording the deviation.

12. The method of claim 7, further comprising:

generating a data lineage in response to the deviation being identified.

13. A non-transitory computer storage medium comprising instructions that, when executed by a processor, cause the processor to perform:

receiving a request from a pipeline manager executing on a host platform to execute a job comprising a sequence of job steps;

in response to the request, instantiating a sequence of job step executors within the data processing pipeline before execution of the job, wherein the instantiating comprises resolving dependencies of the job step executors in the sequence of job step executors;

executing the sequence of job steps;

recording current job execution data generated by the sequence of job step executors when the job is executed;

comparing a current job step execution dataset to the historical job execution data in the data store;

identifying a deviation in the sequence of job steps based on the comparison; and in response to the deviation being identified, generating a failure alert and capture metadata about a job step with the deviation from the pipeline manager;

wherein the sequence of job steps is determined using a Directed Acyclic Graph (DAG) of executors generated based on the dependencies of the job step executors.

14. The non-transitory computer storage medium of claim 13, wherein the sequence of job steps is defined in one or more configuration files.

15. The non-transitory computer storage medium of claim 13, wherein the DAG comprises recording executors that record the current job execution data.

16. The non-transitory computer storage medium of claim 13, wherein the DAG comprises compare executors that compare the current job step execution dataset to the historical job execution data.

17. The non-transitory computer storage medium of claim 13, wherein the instructions cause the processor to perform:

recording the deviation; and generating a data lineage in response to the deviation being identified.

* * * * *